(12) United States Patent
Hsieh

(10) Patent No.: US 11,400,566 B2
(45) Date of Patent: Aug. 2, 2022

(54) ROLLER WRENCH

(71) Applicant: KABO TOOL COMPANY, Taichung (TW)

(72) Inventor: Chih-Ching Hsieh, Taichung (TW)

(73) Assignee: KABO TOOL COMPANY, Taichung City, VA (US)

( * ) Notice: Subject to any disclaimer, the term of this patent is extended or adjusted under 35 U.S.C. 154(b) by 0 days.

(21) Appl. No.: 17/183,287

(22) Filed: Feb. 23, 2021

(65) Prior Publication Data

US 2021/0260727 A1  Aug. 26, 2021

Related U.S. Application Data

(60) Provisional application No. 62/981,322, filed on Feb. 25, 2020, provisional application No. 63/003,775, filed on Apr. 1, 2020.

(51) Int. Cl.
*B25B 13/00* (2006.01)
*B25B 13/46* (2006.01)
*F16D 71/04* (2006.01)

(52) U.S. Cl.
CPC .......... *B25B 13/463* (2013.01); *B25B 13/462* (2013.01); *F16D 71/04* (2013.01)

(58) Field of Classification Search
CPC ... B25B 13/463; B25B 13/462; B25B 13/461; F16D 71/04

USPC .............................................. 81/59.1, 60, 63
See application file for complete search history.

(56) References Cited

U.S. PATENT DOCUMENTS

| | | | | |
|---|---|---|---|---|
| 2,138,331 A | * | 11/1938 | Ward | B25B 13/463 192/43.1 |
| 4,051,935 A | * | 10/1977 | Nakayama | B25B 13/462 192/44 |
| 5,235,878 A | * | 8/1993 | Young | B25B 13/5066 192/44 |
| 9,296,093 B2 | * | 3/2016 | Ross | B25B 13/462 |
| 2005/0120832 A1 | * | 6/2005 | Chiang | B25B 13/461 81/59.1 |
| 2014/0060257 A1 | * | 3/2014 | Douglass | B25B 13/462 81/59.1 |
| 2016/0288301 A1 | * | 10/2016 | Snook | B25B 15/04 |
| 2018/0079055 A1 | * | 3/2018 | Wang | B25B 13/46 |

\* cited by examiner

*Primary Examiner* — Joseph J Hail
*Assistant Examiner* — Shantese L McDonald
(74) *Attorney, Agent, or Firm* — Guice Patents PLLC

(57) ABSTRACT

The invention relates to a roller wrench comprising: a body with a circular chamber; a driving member being a regular polygonal component capable of rotating in the chamber; and a plurality of rollers installed in the chamber, Each of the rollers is located between a side of the driving member and a peripheral wall of the chamber; one end of each of the rollers is pivotally connected to an end surface of a reversing knob, so that the reversing knob drives the rollers to displace simultaneously. Thereby, the components of the roller wrench can be effectively latched with one another, and a torque value of the roller wrench will not be reduced.

8 Claims, 12 Drawing Sheets

ROLLER WRENCH

CROSS REFERENCE TO RELATED APPLICATION

This patent application claims priority to U.S. Provisional Patent Application Ser. No. 62/981,322, entitled "ROLLER WRENCH", filed on Feb. 25, 2020, and priority to U.S. Provisional Patent Application Ser. No. 63/003,775, entitled "ROLLER WRENCH", filed on Apr. 1, 2020.

BACKGROUND OF THE INVENTION

Field of Invention

The invention is related to wrenches, and more particularly to a roller wrench.

Related Art

FIG. 1 shows a conventional reversible roller wrench 10, a driving member 14 is installed in a circular chamber 12 of a head 11, the driving member 14 has six sides 15, a center of each of the sides 15 has a concave portion 152, and the concave portion 152 makes two edges of each of the sides 15 respectively form a latching surface 151. Six rollers 16 are installed between the six sides 15 and a peripheral wall 13 of the chamber 12 respectively. A reversing knob 17 is installed on a top of the head 11, and six walls 171 are protrudingly provided on a bottom surface of the reversing knob 17 and six limiting grooves 172 are formed between the six walls 171; the six rollers 16 are respectively limited in the six limiting grooves 172, as shown in FIG. 2. The reversing knob 17 can be rotated and positioned at two positions by the three elastic positioning components 18. Please refer to FIGS. 1 and 3, the three elastic positioning components 18 are respectively installed in three holes 173 provided on the bottom surface of the reversing knob 17, a top surface of the driving member 14 is provided with two sets of positioning holes 153 and 154, and the elastic positioning components 18 can be elastically snapped into either set of the two sets of positioning holes 153 and 154.

When the reversing knob 17 is rotated in one direction, the reversing knob 17 can be switched to be positioned at a first position, as shown in FIG. 2. At this time, one ends of the three elastic positioning components 18 are elastically snapped into the first set of the positioning holes 153, and this makes each of the rollers 16 to contact with the latching surface 151 (such as the latching surface on the left edge) at one edge of each of the sides 15; when the reversing knob 17 is rotated in another direction, the reversing knob 17 can be switched to a second position, and the rollers 16 are respectively moved to another edge of each of the sides 15 so that each of the rollers 16 is in contact with the latching surface 151 (for example, the latching surface on the right edge) at another edge of each of the sides 15; and the elastic positioning components 18 are elastically snapped into the second set of the positioning holes 154 respectively. By switching the reversing knob 17 to the first position or the second position, the roller wrench 10 has a reversing function.

Each of the rollers 16 has a disengaging-engaging function with the latching surface 151 with which the roller 16 is in contact. Taking the latching surface 151 on the left edge of FIG. 2 as an example, there is an included angle θ between each of the latching surfaces 151 and the peripheral wall 13 of the chamber 12, on the left side of the latching surface 151, a gap between the latching surface 151 and the peripheral wall 13 gradually decreases, and on the right side of the latching surface 151, a gap between the latching surface 151 and the peripheral wall 13 gradually increases. When the wrench 10 is turned clockwise, the roller 16 moves toward a direction of a small gap, and therefore, each of the rollers 16, each of the corresponding latching surfaces 151 and the peripheral wall 13 of the chamber 12 are latched with one another, and the wrench 10 can drive the driving member 14 to turn clockwise; conversely, when the wrench 10 is turned counterclockwise, the roller 16 moves toward a direction of a large gap, each of the rollers 16, each of the corresponding latching surfaces 151 and the peripheral wall 13 of the chamber 12 cannot be latched with one another, and the wrench 10 cannot drive the driving member 14 to rotate.

The conventional roller wrench 10 has several drawbacks that need to be improved. Firstly, an object of disposing the six walls 171 on the bottom surface of the reversing knob 17 is to restrain the six rollers 16, so as to restrain the rollers 16 in the limiting grooves 172, and to cause the reversing knob 17 to be capable of driving the rollers 16 to displace, but the structure of the six walls 171 makes the reversing knob 17 difficult to be manufactured and with high costs.

Secondly, if gaps between the limiting grooves 172 and the rollers 16 are different, the reversing knob 17 will not be able to drive all the rollers 16 to move together at the same time, so that some of the rollers 16 have reliably contacted with the latching surfaces 151 where the rollers 16 are supposed to be located on, and some of the rollers 16 have not reliably contacted with the latching surfaces 151 where the rollers 16 are supposed to be located on, that is, some of the rollers 16 have contacted with the latching surfaces 151, but some of the rollers 16 have not yet contacted with the latching surfaces 151, causing proper latching effect between the head 11, the rollers 16 and the driving member 14 to be reduced, which affects an operating torque and effect of using the roller wrench 10.

In addition, in terms of manufacturing tolerances, if the limiting grooves 172 interfere with the rollers 16, two sides of each of the rollers 16 will be clamped by two walls 171 and will not be able to roll, causing the head 11 and the driving member 14 to fail to effectively latch through the rollers 16, which also affects an operating torque and effect of using the roller wrench 10.

SUMMARY OF THE INVENTION

The invention aims to solve the drawbacks disclosed above and its main object is to provide a roller wrench, and to make the roller wrench easy to be manufactured and can reduce the manufacturing costs.

Another object of the invention is to provide a roller wrench capable of ensuring effective actuations between components of the roller wrench and avoiding degrading of an operating torque of the roller wrench.

In order to achieve the above-mentioned objects, the roller wrench provided by the invention comprises:

a body with a head, a circular chamber disposed in the head;

a driving member being a regular polygonal component with a plurality of sides, the driving member installed in the chamber of the head and capable of rotating in the chamber;

a plurality of rollers installed in the chamber and respectively located between the sides of the driving member and a peripheral wall of the chamber; and a reversing knob rotatably installed on the head and capable of driving the rollers to move in the chamber, so that each of the rollers moves between one edge and another edge of each of the sides of the driving member; wherein:

the rollers are arranged in a circle at equal intervals, and one end of each of the rollers is rotatably pivotally connected to one end surface of the reversing knob; when the reversing knob is rotated, the reversing knob drives the rollers to displace.

Thereby, the reversing knob does not need to be made with the walls of the conventional structure, so that the reversing knob is easy to be manufactured and the manufacturing costs can be reduced. Furthermore, the reversing knob is capable of driving the rollers to displace together, so that the rollers respectively contact with one of the edges of one of the corresponding sides of the driving member simultaneously, and the invention also solves the drawback that the two sides of each of the rollers are clamped by two walls in the conventional structure, so that the head, the rollers and driving member of the roller wrench of the invention are capable of effectively latching with one another, and an operating torque of the roller wrench will not be reduced.

Preferably, one end of each of the rollers is pivotally connected to one end surface of the reversing knob with a pivot shaft.

BRIEF DESCRIPTION OF THE DRAWINGS

The objects, features, and achieved efficacies of the invention can be understood from the description and drawings of the following preferred embodiments, in which.

DETAILED DESCRIPTION OF THE INVENTION

Figure 4:
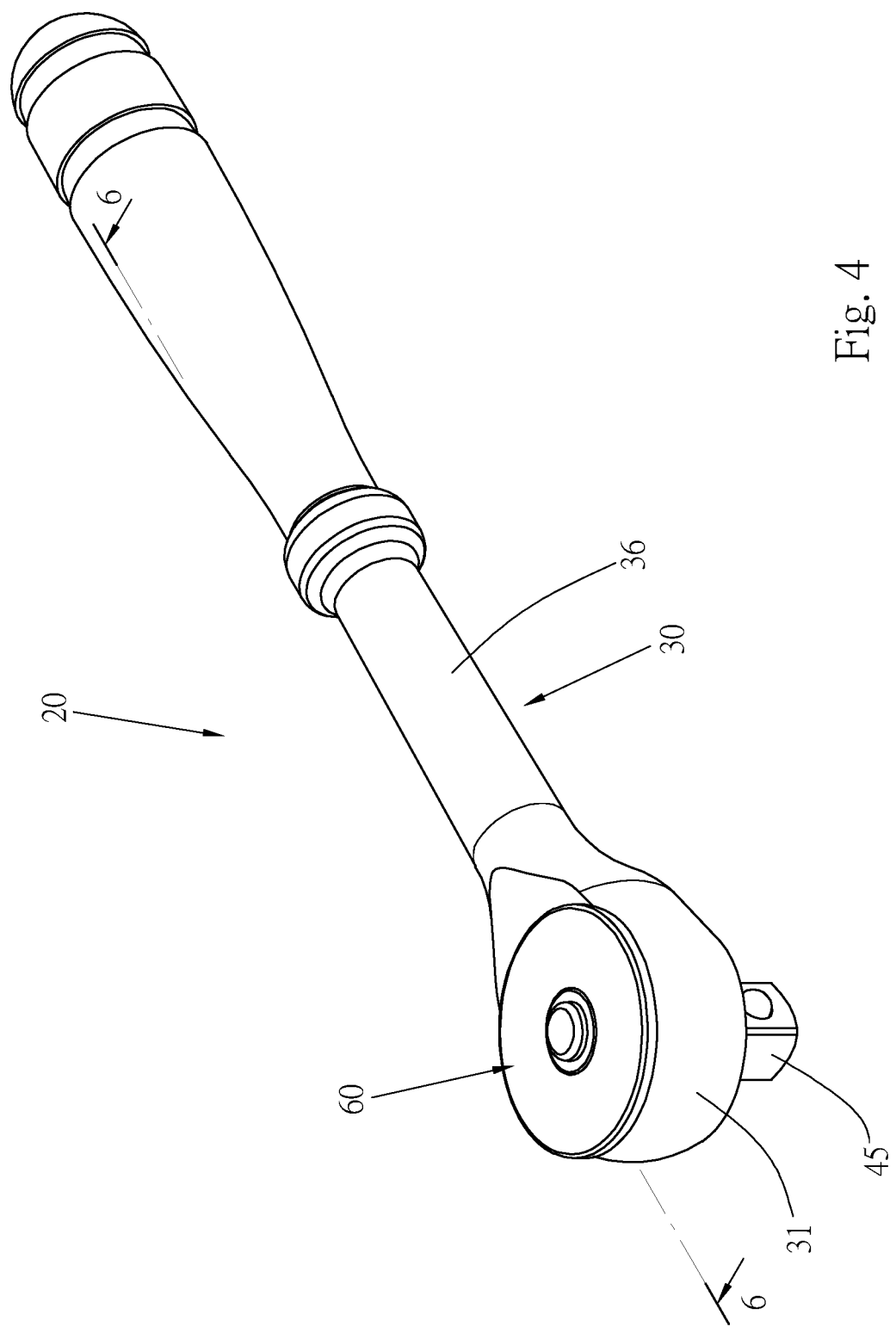
FIG. 4 is a perspective view of a roller wrench of a first preferred embodiment of the invention.
Figure 5:
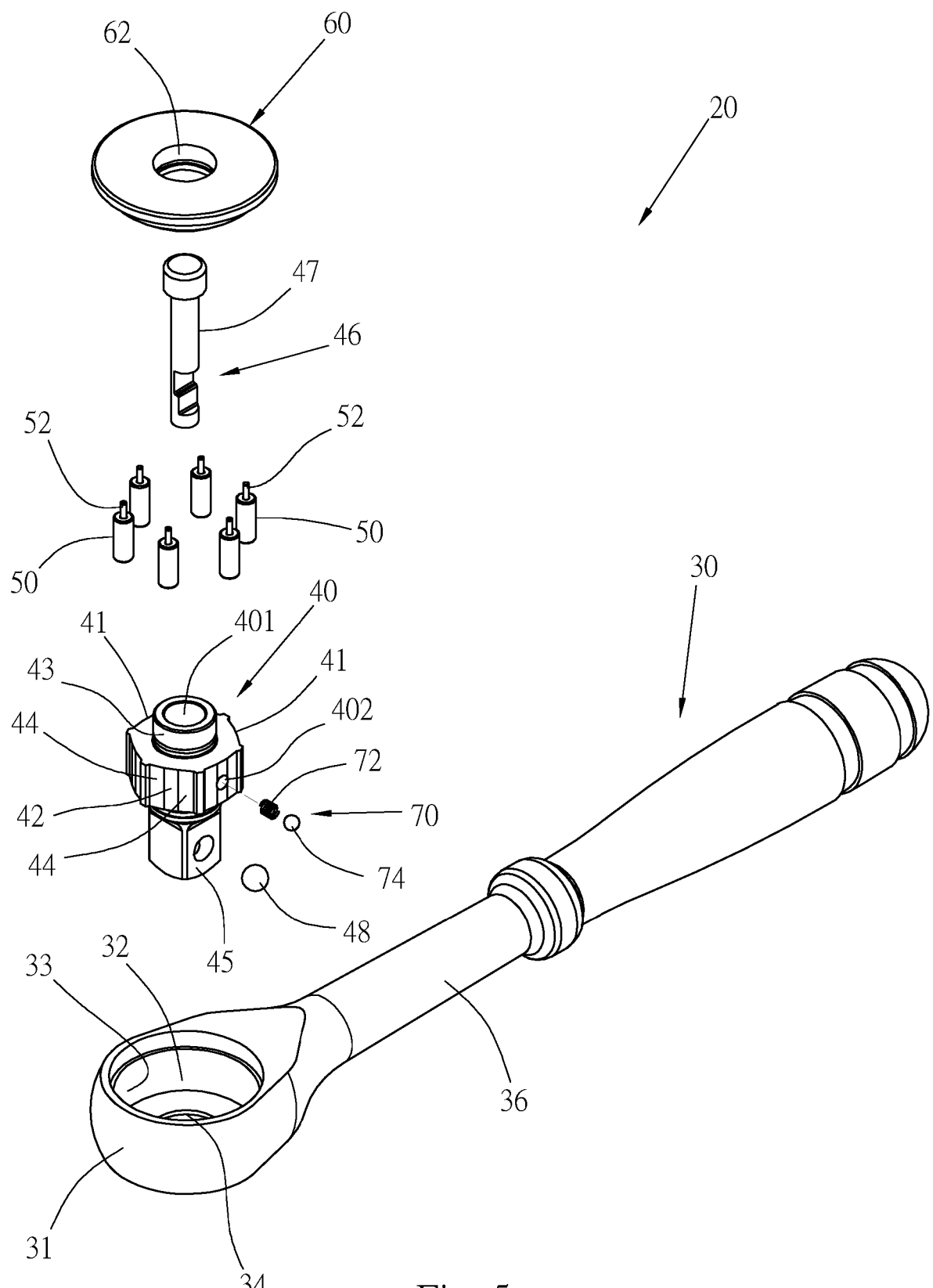
FIG. 5 is an exploded perspective view of FIG. 4.
Figure 6:
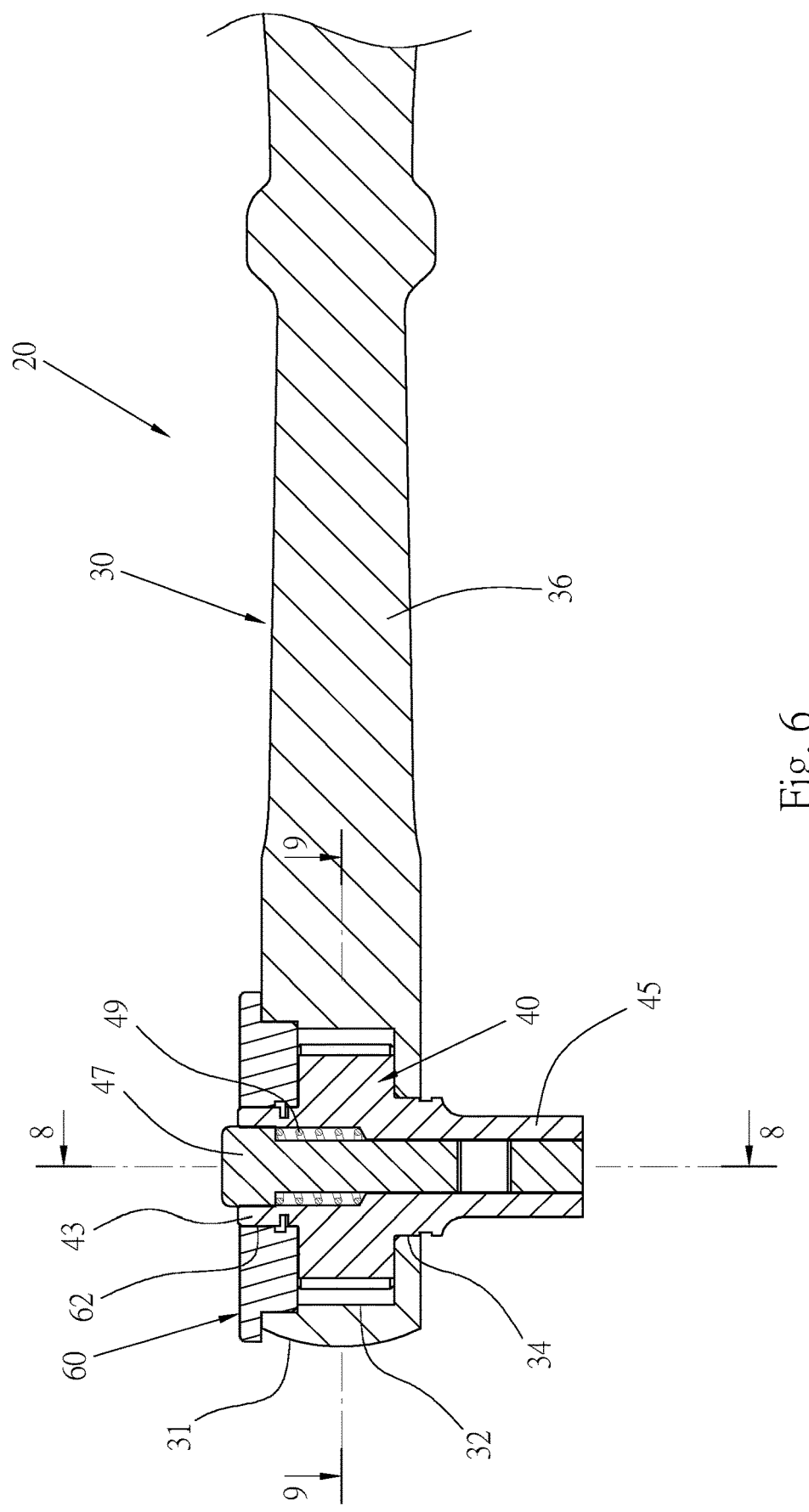
FIG. 6 is a cross-sectional view taken along section line 6-6 of FIG. 4.

Please refer to FIGS. 4 to 6 for a roller wrench 20 of a first preferred embodiment of the invention, the roller wrench 20 comprises: a body 30, a driving member 40, a plurality of rollers 50, a reversing knob 60 and at least one elastic positioning component 70.

The body 30 has a head 31 and a shaft 36 connected to each other, and the head 31 is located at a front end of the shaft 36. A top surface of the head 31 is inwardly recessed with a circular chamber 32; and a bottom surface of the head 31 is penetrated, such as by disposing with a through hole 34.

Figure 7:
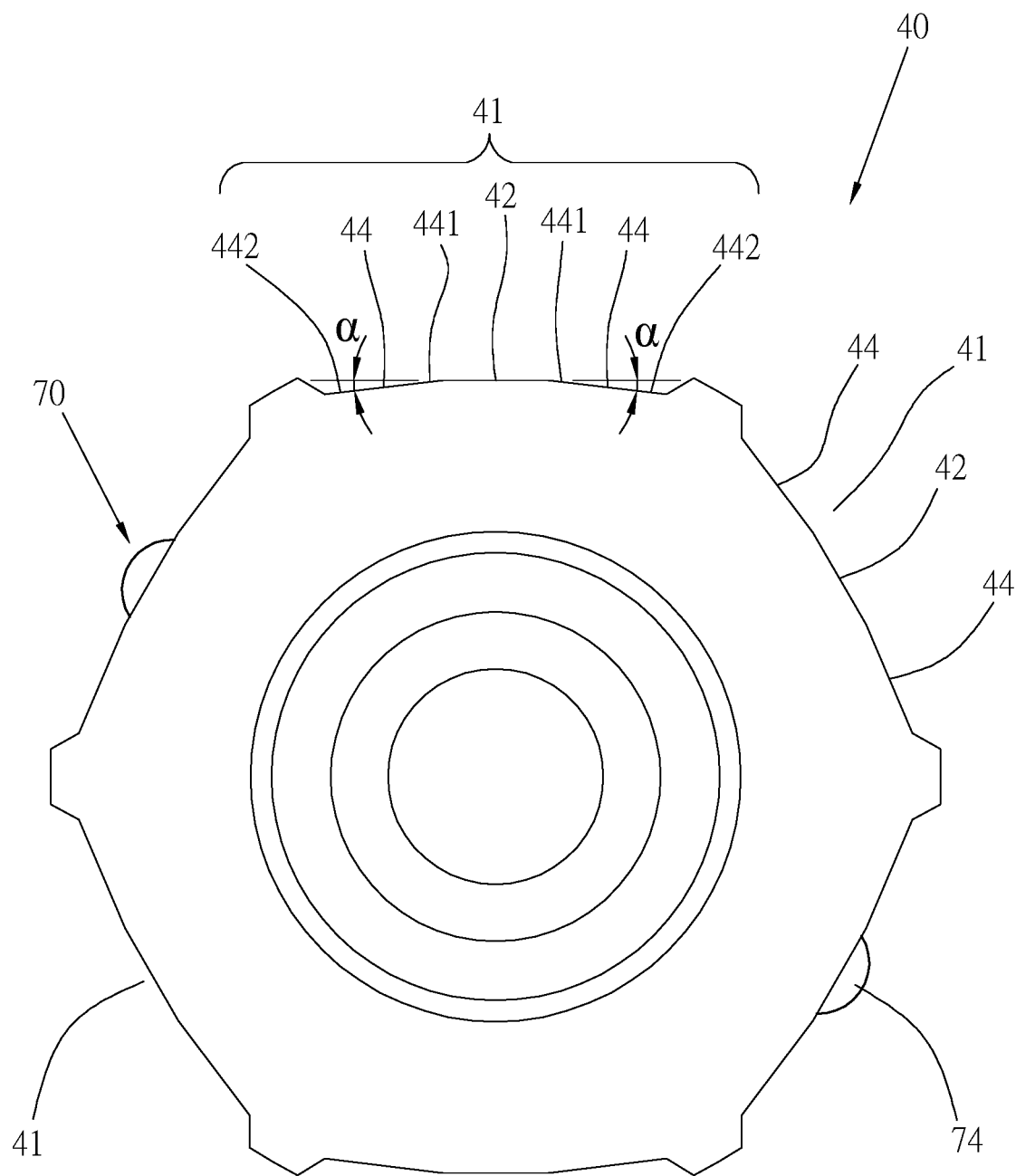
FIG. 7 is a top view of a driving member of the first preferred embodiment of the invention.
Figure 8:
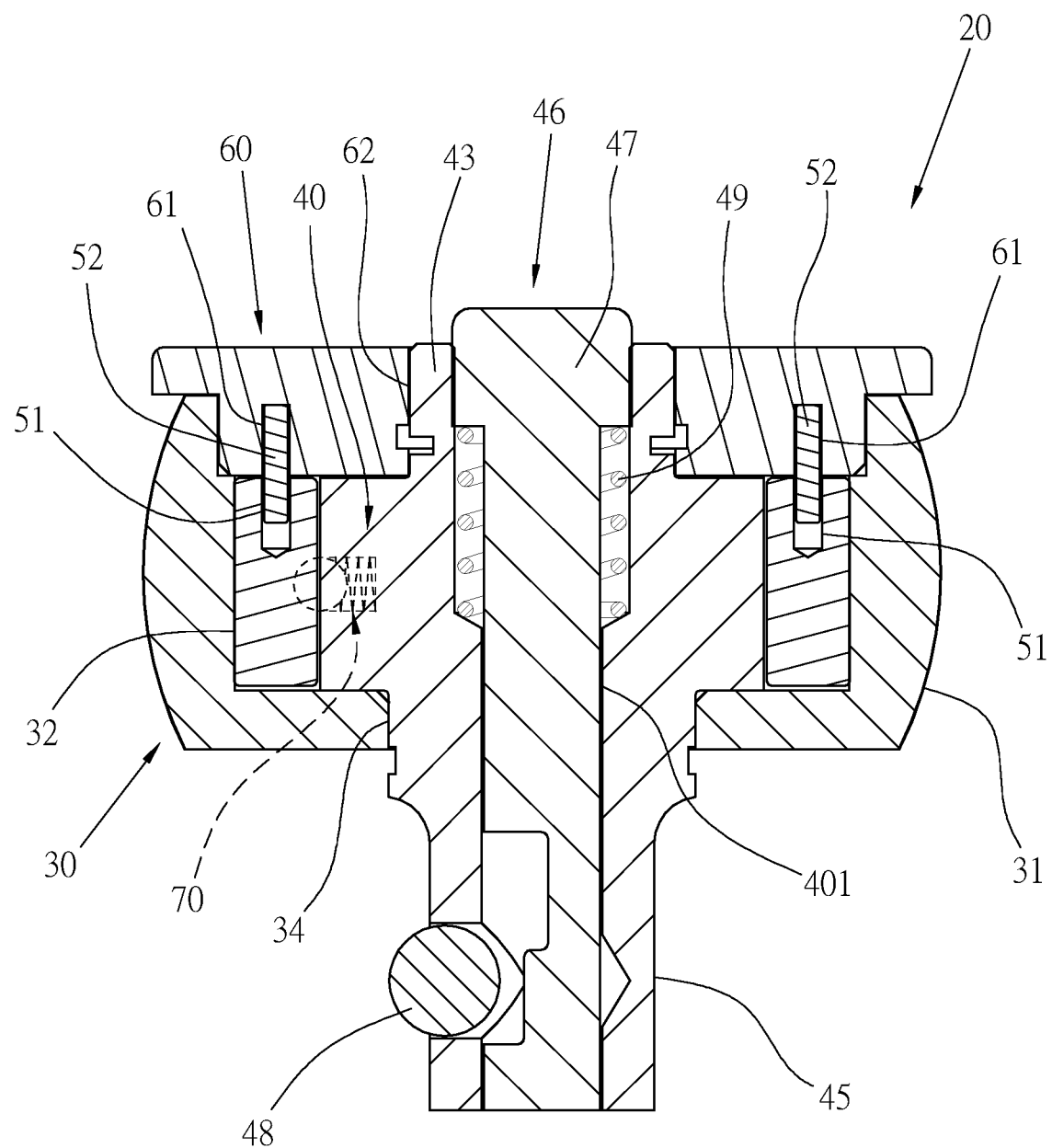
FIG. 8 is a cross-sectional view taken along section line 8-8 of FIG. 6.
Figure 9:
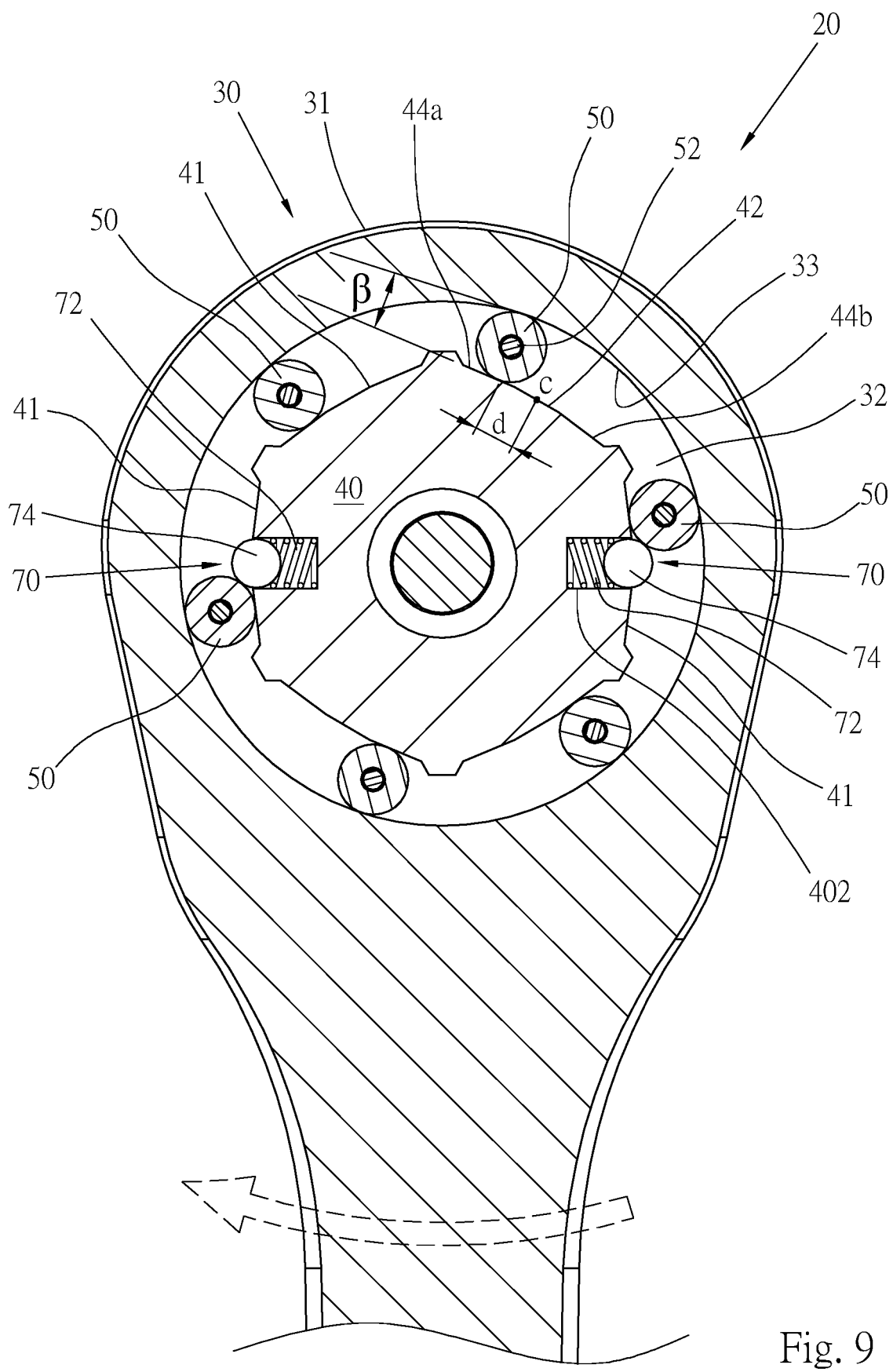
FIG. 9 is a cross-sectional view taken along section line 9-9 of FIG. 6 showing that rollers of the roller wrench are positioned at first positions.

Please refer to FIG. 7 in conjunction with the above figures. The driving member 40 is a regular polygonal component, such as a regular quadrilateral, a regular pentagon, a regular hexagon, a regular octagon, etc., and has a plurality of sides. In the preferred embodiment disclosed in this specification, the driving member 40 is a regular hexagonal component as an example, and has six sides 41. Each of the sides 41 of the driving member 40 has a central area 42 which is a flat surface; each of the sides 41 is respectively provided with a concave (recessed toward an inside of the driving member 40) latching surface 44 on two sides of the central area 42, each of the latching surfaces 44 has an inner side 441 connected to the central area 42 and an outer side 442 away from the central area 42. A concave state of each of the latching surfaces 44 is gradually recessed inwardly from the inner side 441 to the outer side 442, so that the outer side 442 is recessed from each of the sides 41. Although the latching surfaces 44 are flat in appearance, each of the latching surfaces 44 can be a gradually concaved arc surface. On each of the sides 41, an included angle α is formed between each of the latching surfaces 44 and the central area 42, the included angle α is between 1 degree and 10.4 degrees, or between 2.2 degrees and 10.4 degrees, preferably between 4.3 degrees and 8.8 degrees. A protrusion 411 is further provided between the two adjacent sides 41, and each of the protrusions 411 is formed between the outer sides 442 of the two adjacent latching surfaces 44, which is capable of increasing a structural strength of the driving member 40. The driving member 40 is installed in the chamber 32 of the head 31 and capable of rotating in the chamber 32. In addition, the driving member 40 is used for coupling and driving threadedly-connecting elements such as nuts or bolts, or coupling sockets. A center of the driving member 40 can be provided with a polygonal sleeve hole to sleeve and connect with a threadedly-connecting element; a bottom surface of the driving member 40 of this embodiment has an insert column 45 protruding outside of the head 31 from the through hole 34. In addition, a quick snap mechanism 46, as shown in FIGS. 5, 8 and 9, is provided in the driving member 40, and includes a rod 47 slidably installed in a slideway 401 of the driving member 40. When the rod 47 is pressed, a bead 48 can be pushed to expose the bead 48 from the insert column 45 to snap with a socket. A spring 49 can be used to reposition the rod 47. The quick snap mechanism 46 is a conventional component and is not a main subject matter of the invention, so it will not be further described.

A quantity of the rollers 50 is the same as a quantity of the sides 41 of the driving member 40, that is, the wrench 20 in the preferred embodiment of the specification has six rollers 50.

Figure 12:
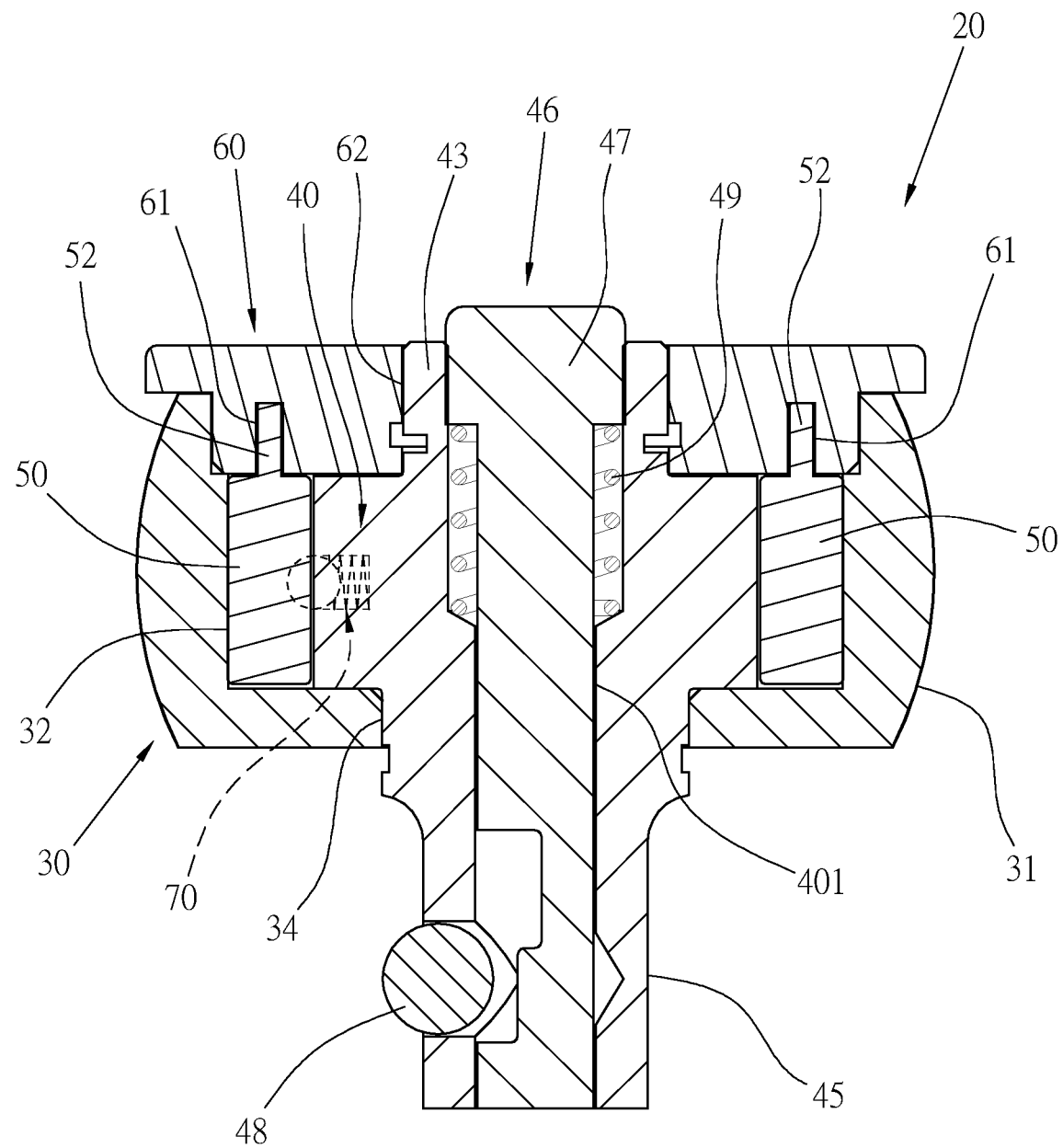
FIG. 12 is similar to FIG. 8 and is a cross-sectional view of the roller wrench of a second preferred embodiment of the invention.

The reversing knob 60 is generally disk-shaped, and the rollers 50 are arranged in a circle and pivotally disposed on a bottom surface of the reversing knob 60 at equal intervals. Please refer to FIG. 8, a top end of each of the rollers 50 is pivotally connected to the bottom surface of the reversing knob 60 by a pivot shaft 52 so that the rollers 50 are capable of rotating freely. In this embodiment, each of the pivot shafts 52 is an independent member, and its two ends are respectively pivotally disposed in a pivot hole 61 in the bottom surface of the reversing knob 60 and in a pivot hole 51 in a top surface of each of the rollers 50. Please refer to FIG. 12 for a cross-sectional view of a second preferred embodiment of the roller wrench 20 of the invention (the same components use the reference numbers of the first preferred embodiment). Each of the pivot shafts 52 can also be integrally formed with each of the rollers 50, and its free end is pivotally disposed in the pivot hole 61 of the reversing knob 60. In a similar way, in implementation, each of the pivot shafts 52 can also be integrally formed with the reversing knob 60, and its free end is pivotally disposed in the pivot hole 51 of each of the rollers 50.

Please refer to FIGS. 8 and 9, the rollers 50 and the reversing knob 60 are installed in the head 31, the rollers 50 are placed in the circular chamber 32, and each of the rollers 50 is located between one of the sides 41 of the driving member 40 and a peripheral wall 33 of the chamber 32; the reversing knob 60 covers the top surface of the head 31, seals the chamber 32, and is capable of being rotated. A protruded wall 43 provided on a top surface of the driving member 40 penetrates from a through hole 62 in a center of the reversing knob 60. The chamber 32, the driving member 40 and the reversing knob 60 are concentric.

The elastic positioning component 70 is installed on a peripheral surface of the driving member 40. This preferred embodiment provides the two elastic positioning components 70, which can be respectively installed on any two of the sides 41 of the driving member 40, for example, on the two different sides 41 not adjacent to each other. The two elastic positioning components 70 are arranged on the two sides 41 of the driving member 40 at equal intervals (180 degrees apart) in this embodiment. Each of the elastic positioning components 70 has an elastic element 72 and an abutting member 74, which are installed in an installation hole 402 of one of the sides 41 of the driving member 40, and are capable of displacing in the installation hole 402. The abutting member 74 is preferably a bead, which is abutted by the elastic element 72 to be exposed from the peripheral surface of the driving member 40. Each of the elastic positioning components 70 is located between the two latching surfaces 44 of the side 41 where the elastic positioning component 70 is located at, that is, located at the central area 42 of the side 41. As shown in FIG. 9, the abutting member 74 of each of the elastic positioning components 70 restricts displacement of one of the rollers 50. Since all the rollers 50 are pivotally connected to the reversing knob 60, the rollers 50 have a relationship of moving simultaneously and are incapable of moving independently. As shown in the figures, when some of the rollers 50 are restrained by the elastic positioning components 70 and incapable of moving freely, all the rollers 50 are incapable of moving freely. Therefore, the two elastic positioning components 70 simultaneously restrain all the rollers 50 to position the rollers 50 and the reversing knob 60.

Figure 10:
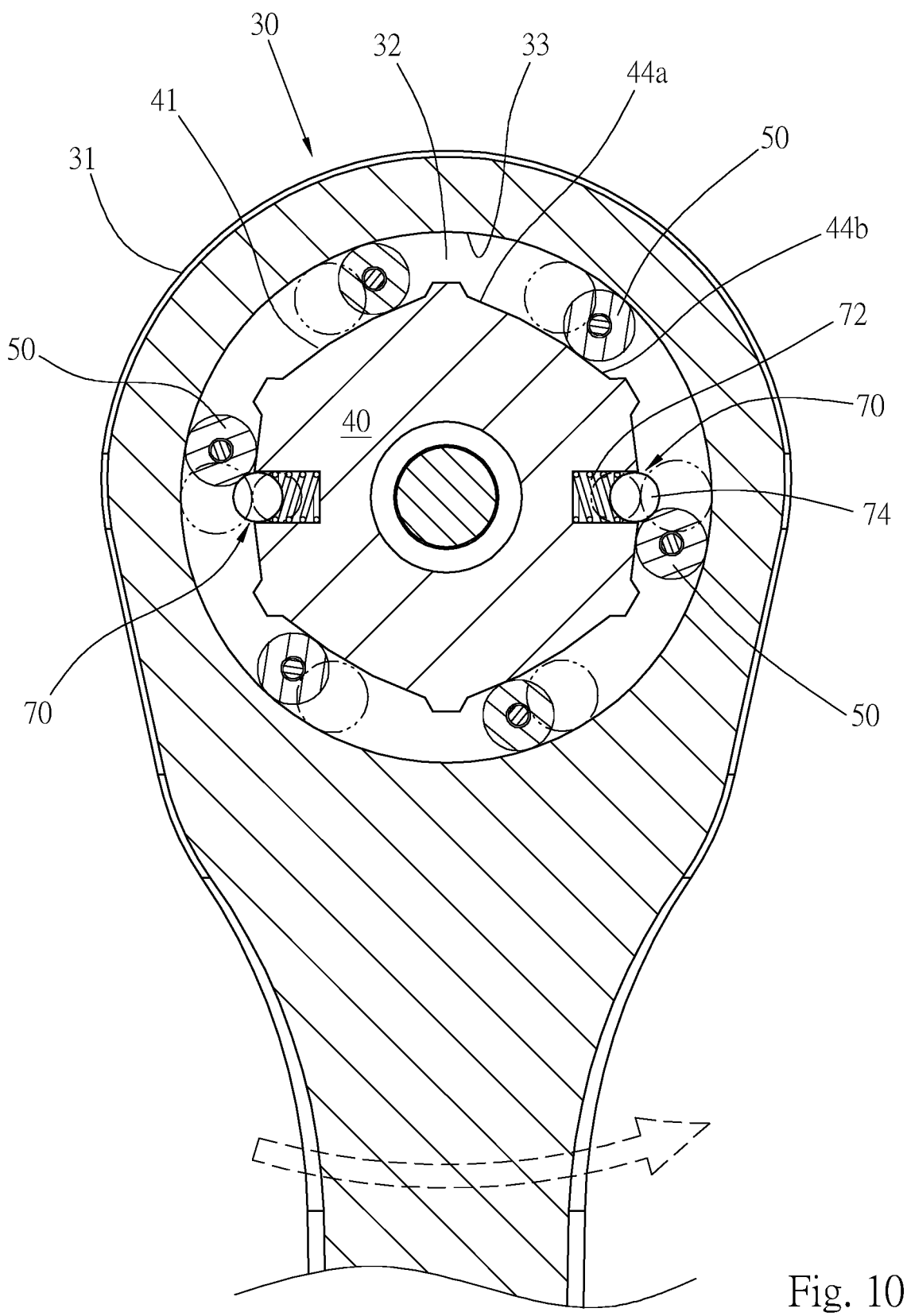
FIG. 10 is similar to FIG. 9 showing that the rollers of the roller wrench are positioned at second positions.

The usage state of the roller wrench 20 will be described hereinafter. The reversing knob 60 is capable of moving the rollers 50 to a first position or a second position to switch the roller wrench 20 in different operating directions. Based on the directions of FIGS. 4, 9 and 10, when the reversing knob 60 is turned counterclockwise, the reversing knob 60 can be switched to the first position, and the rollers 50 can be moved to the first positions as shown in FIG. 9, so that each of the rollers 50 contacts with a latching surface 44a at a left edge of the corresponding side 41; when the reversing knob 60 is turned clockwise, the reversing knob 60 is switched to the second position, and the rollers 50 are moved to the second positions as shown in FIG. 10, so that each of the rollers 50 contacts with a latching surface 44b at a right edge of the corresponding side 41. In order to facilitate identification of the first position and the second position, in this specification, the reference numeral 44a represents the latching surface at the left edge, and the reference numeral 44b represents the latching surface at the right edge. When collectively referring to the latching surface, it is indicated by the reference numeral 44.

FIG. 9 shows that the reversing knob 60 switches the rollers 50 to the first positions, at this time, each of the rollers 50 contacts with the latching surface 44a at the left edge of the corresponding side 41; the two elastic positioning components 70 are capable of restricting the rollers 50 at the first positions, so that the rollers 50 are incapable of moving to the second positions, at the same time, the reversing knob 60 also remains positioned at the first position.

On the outer side 442 of each of the latching surfaces 44a, a gap between each of the latching surfaces 44a and the peripheral wall 33 of the chamber 32 gradually decreases, and on the inner side 441 of each of the latching surfaces 44a, a gap between each of the latching surfaces 44a and the peripheral wall 33 gradually increases. When the rollers 50 are at the first positions, and the wrench 20 is turned clockwise, the rollers 50 move toward a direction (that is, toward the outer sides 442 of the latching surfaces 44a) of a small gap between the latching surfaces 44a and the peripheral wall. Therefore, each of the rollers 50, each of the latching surfaces 44a and the peripheral wall 33 of the chamber 32 are latched with one another, and the wrench 20 is capable of driving the driving member 40 to rotate clockwise, thereby rotating a threadedly-connecting element clockwise. Conversely, when the wrench 20 is turned counterclockwise, the rollers 50 will move toward a direction of a large gap, each of the rollers 50, each of the latching surfaces 44a and the peripheral wall 33 of the chamber 32 are incapable of latching with one another, and the wrench 20 is incapable of driving the driving member 40 to rotate. With this disengaging-engaging effect, the wrench 20 is capable of rotating a threadedly-connecting element unidirectionally (clockwise).

Please refer to FIG. 9, since the outer side 442 of each of the latching surfaces 44a (44) is an inward concave design, an included angle β between each of the latching surfaces 44a and the peripheral wall 33 of the chamber 32 is smaller, and a width of a gap between each of the latching surfaces 44a and the peripheral wall 33 changes relatively gradually, that is, a gap between each of the latching surfaces 44a and the chamber 32 does not reduce quickly, so when each of the rollers 50 moves toward a direction of a small gap, each of the rollers 50 is capable of moving a longer distance. Using a center c of each of the sides 41 as a starting point, a distance d of the roller 50 moving toward a position where the gap is small is longer, so that each of the rollers 50, each of the latching surfaces 44a and the peripheral wall 33 are capable of effectively latching with one another and producing disengaging-engaging function without the occurrence of slippage and losing effect.

When the reversing knob 60 is rotated clockwise to the second position, the rollers 50 are moved to the second positions and respectively contact with the latching surfaces 44b at the right edges of the sides 41, as shown in FIG. 10. In the process of the rollers 50 moving from the latching surfaces 44a at the left edges to the latching surfaces 44b at the right edges, the two elastic positioning components 70 will be compressed, as shown by an imaginary line, so that the abutting members 74 will be moved into the driving member 40, after the rollers 50 have passed over the abutting members 74 and moved to the latching surfaces 44b at the right edges, the abutting members 74 of the two elastic positioning components 70 will be elastically pushed out by the elastic elements 72, and the abutting members 74 will position the rollers 50 on the latching surfaces 44b at the right edges, and also position the reversing knob 60 at the second position.

When the rollers 50 are positioned at the second positions as shown in FIG. 10, and the wrench 20 is rotated counterclockwise, each of the rollers 50 will move toward a direction (that is, toward the outer sides 442 of the latching surfaces 44b) of a small gap between each of the latching surfaces 44b and the peripheral wall 33. Therefore, each of the rollers 50, each of the latching surfaces 44b and the peripheral wall 33 of the chamber 32 are latched with one another, and the wrench 20 is capable of driving the driving member 40 to rotate counterclockwise. Conversely, when the wrench 20 is turned clockwise, the rollers 50 will move toward a direction of a large gap, each of the rollers 50, each of the latching surfaces 44b and the peripheral wall 33 of the chamber 32 are incapable of latching with one another, and the wrench 20 is incapable of driving the driving member 40 to rotate. Thereby, the wrench 20 is capable of rotating a threadedly-connecting element unidirectionally (counterclockwise).

The roller wrench 20 of the invention has the following efficacies, which can overcome the disadvantages of the conventional structure. Firstly, as for positioning the rollers 50, the structure of the invention is capable of eliminating the walls 171 of the conventional structure; and as for positioning the reversing knob 60 and the rollers 50, the invention only needs to install the elastic positioning component 70 in the driving member 40, the reversing knob 60 and the rollers 50 can be positioned by using the elastic abutting relationship between the elastic positioning component 70 and the rollers 50. Compared with the elastic positioning component 18 and the positioning holes 153, 154 of the conventional structure, the elastic positioning structure of the invention is significantly more simplified. Therefore, the structure of the invention is easier to be manufactured and can reduce costs.

Furthermore, since all the rollers 50 are pivotally connected to the reversing knob 60, the reversing knob 60 is capable of driving all the rollers 50 to move together at the same time, so that all the rollers 50 are reliably in contact with the latching surfaces 44 of the sides 41 respectively where the rollers 50 are supposed to be located on, and the head 31, the rollers 50 and the driving member 40 are reliably latching with one another, ensuring a proper operating torque and effect of using the roller wrench 20.

In addition, because the reversing knob 60 of the invention eliminates the walls 171 of the conventional structure, a situation in which the rollers 50 are clamped by the walls 171 and incapable of rolling will not occur, so that the head 31, the rollers 50 and the driving member 40 are capable of effectively latching with one another, thereby solving the drawback of the conventional structure.

Figure 11:
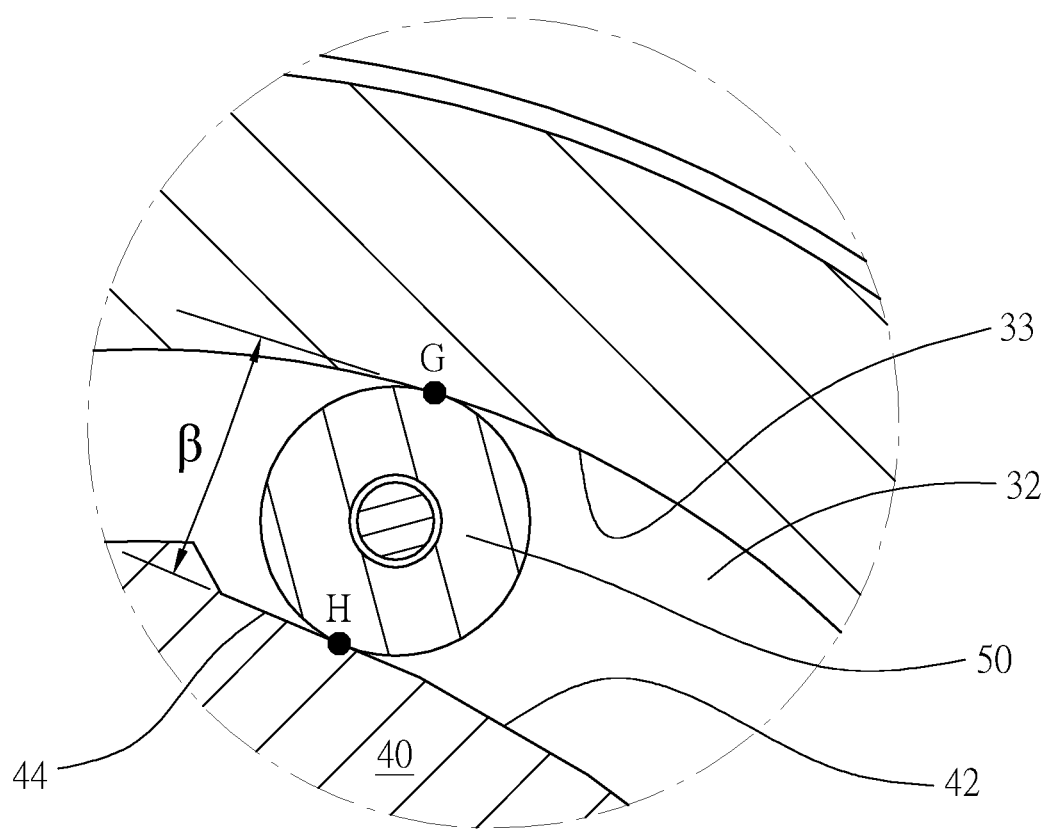
FIG. 11 is an enlarged schematic view of the rollers, latching surfaces and a peripheral wall of a chamber of the wrench.

Since the outer side 442 of each of the latching surfaces 44 of the driving member 40 of the invention is an inward concave design, when each of the rollers 50 moves toward a direction of a small gap, each of the rollers 50 is capable of moving a longer distance (as shown in FIG. 9), so that each of the rollers 50, each of the corresponding latching surfaces 44 and the peripheral wall 33 of the chamber 32 are capable of effectively latching with one another and producing disengaging-engaging function. In addition, please refer to FIG. 11, since a degree of the included angle β between the latching surface 44 and the peripheral wall 33 is small, when latching is formed, a contact point G between the peripheral wall 33 and the roller 50, and a contact point H between the latching surface 44 and the roller 50 can be closer to a center of the roller 50, which are capable of increasing a torque that the wrench 20 is capable of withstanding.

Figure 1:
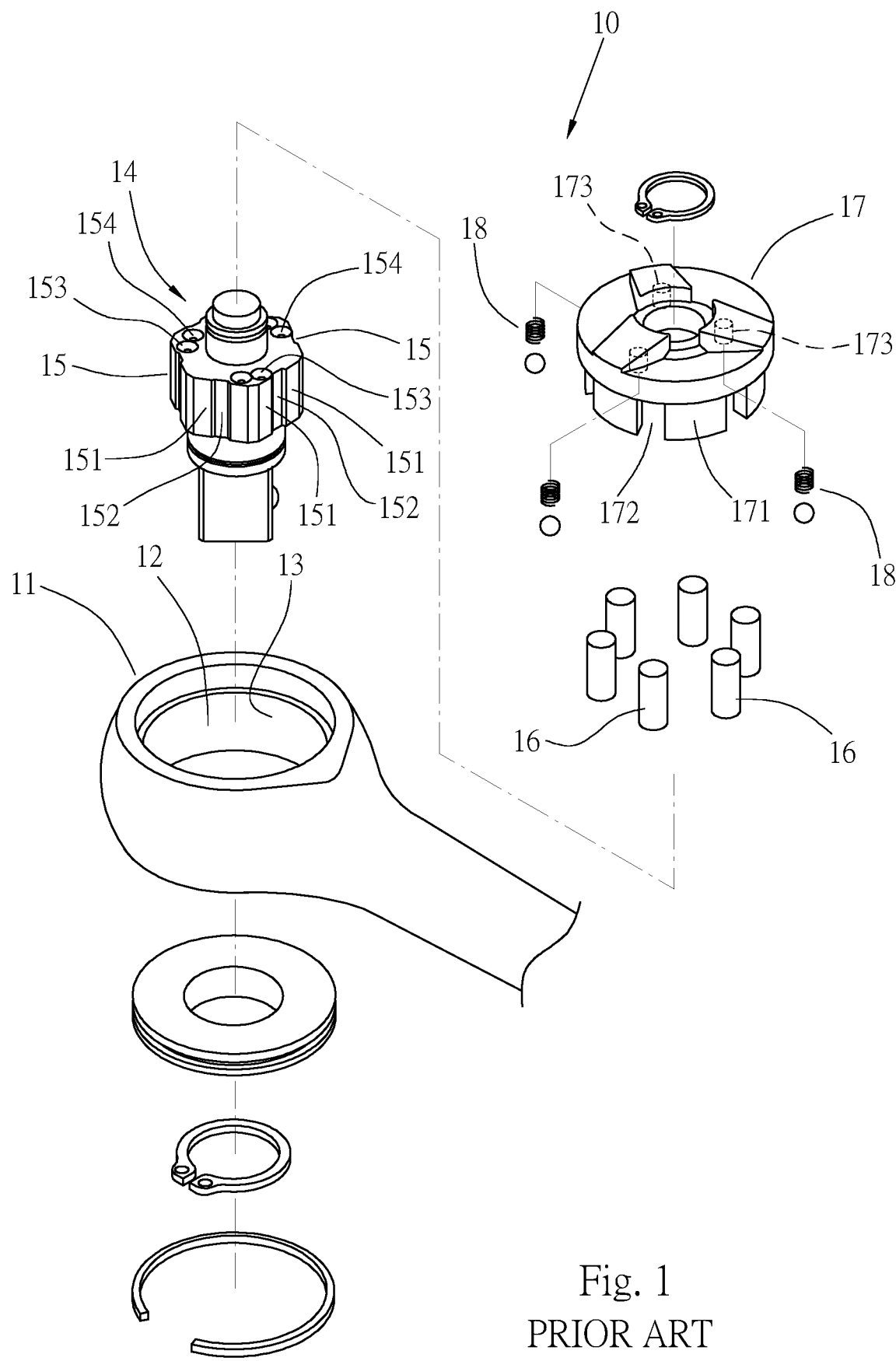
FIG. 1 is an exploded perspective view of a conventional roller wrench.
Figure 2:
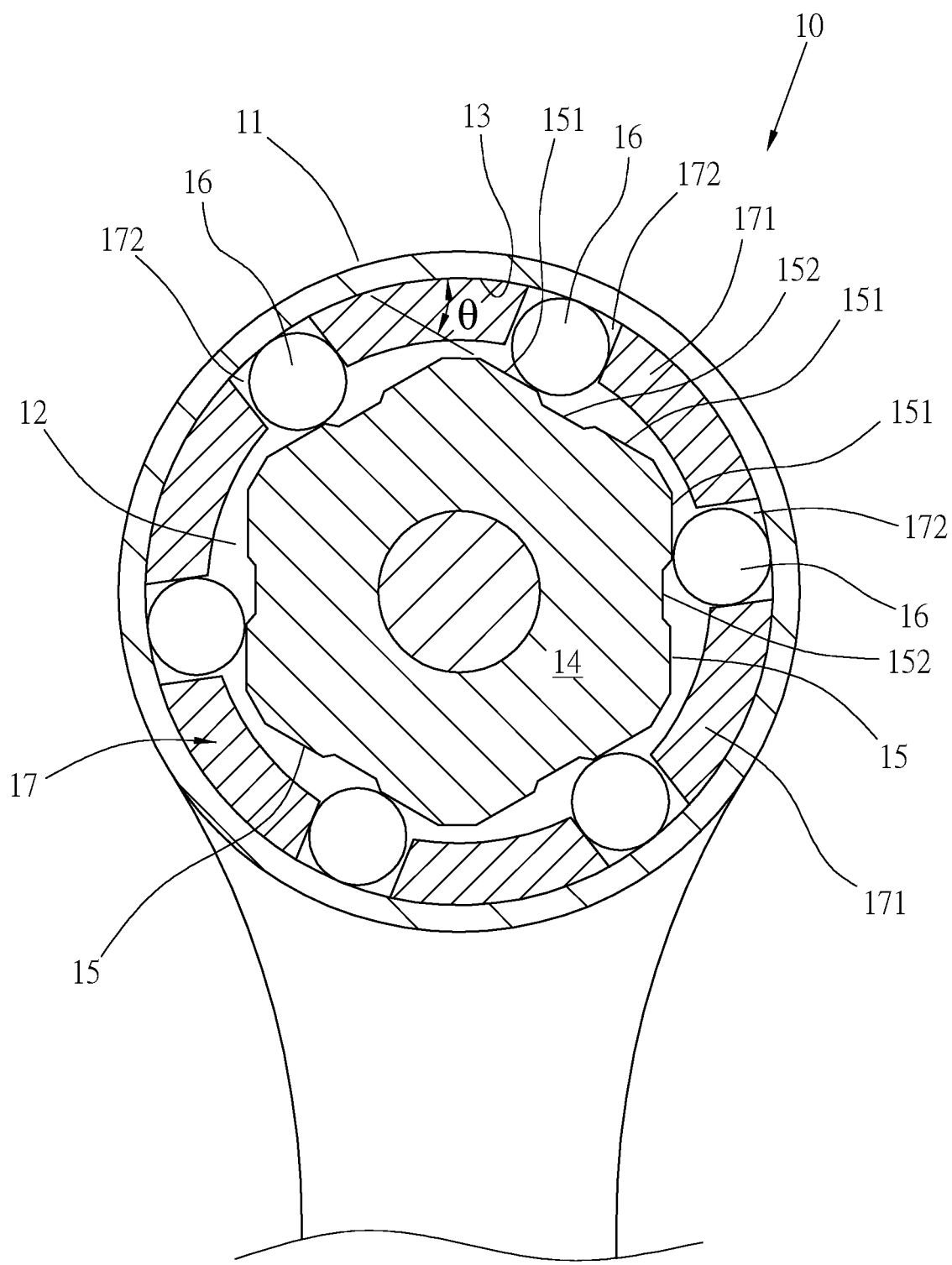
FIG. 2 is a combinational cross-sectional view of FIG. 1.
Figure 3:
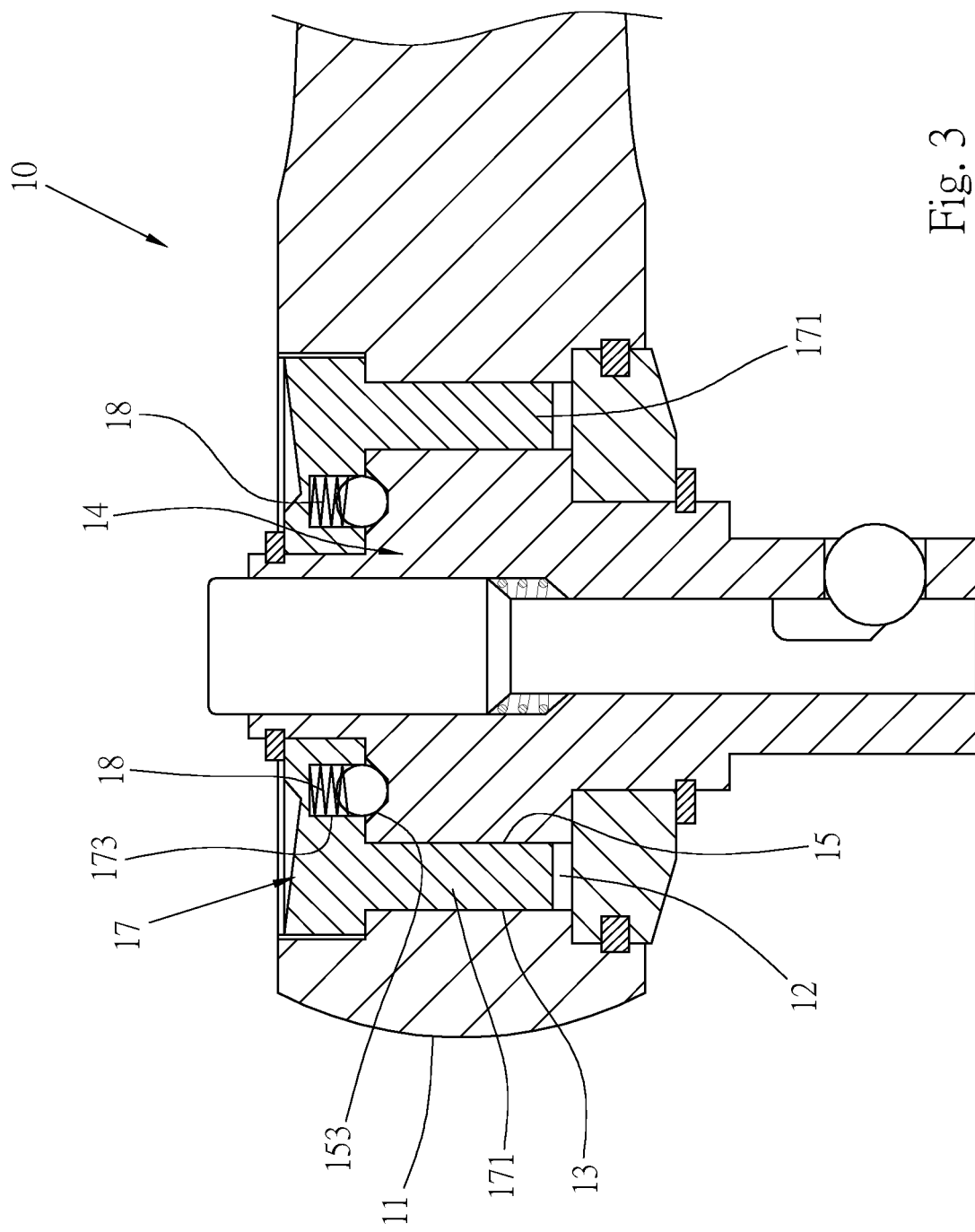
FIG. 3 is a cross-sectional view taken along section line 3-3 of FIG. 2.

It is understandable that the holes 173, the two sets of the positioning holes 153, 154, and the elastic positioning components 18 in FIG. 1 can replace the elastic positioning component 70 in FIG. 5 to position the reversing knob 60 at the first position or the second position.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:
1. A roller wrench comprising:
a body with a head, a circular chamber being disposed in the head;
a driving member being a regular polygonal component with a plurality of sides, the driving member being installed in the chamber of the head and capable of rotating in the chamber;
a plurality of rollers with a quantity the same as a quantity of the sides of the driving member, the rollers being installed in the chamber and respectively located between the sides of the driving member and a peripheral wall of the chamber; and
a reversing knob rotatably installed on the head, the reversing knob being capable of driving the rollers to move in the chamber, so that each of the rollers moving between one edge and another edge of each of the sides of the driving member;
wherein the rollers are arranged in a circle at equal intervals, and one end of each of the rollers is rotatably pivotally connected to one end surface of the reversing knob; when the reversing knob is rotated, the reversing knob drives the rollers to displace;
wherein one end of each of the rollers is pivotally connected to the reversing knob with a pivot shaft.

2. The roller wrench as claimed in claim 1, wherein one end surface of the reversing knob is provided with a plurality of pivot holes; one end of each of the rollers is provided with a pivot hole; and further includes a plurality of pivot shafts, one end of each of the pivot shafts is pivotally disposed in one of the pivot holes of the reversing knob, and another end of each of the pivot shafts is pivotally disposed in the pivot hole of each of the rollers.

3. The roller wrench as claimed in claim 1, wherein one end of each of the rollers is integrally formed with a pivot shaft; one end surface of the reversing knob is provided with a plurality of pivot holes; and the rollers are pivotally disposed in the pivot holes of the reversing knob with the pivot shafts of the rollers respectively.

4. The roller wrench as claimed in claim 1, wherein one end surface of the reversing knob is integrally provided with a plurality of pivot shafts; one end of each of the rollers is provided with a pivot shaft; and the pivot holes of the rollers are pivotally disposed on the pivot shafts of the reversing knob respectively.

5. The roller wrench as claimed in claim 1, wherein the reversing knob is disk-shaped.

6. The roller wrench as claimed in claim 1, wherein each of the sides of the driving member has a central area, a concave latching surface is respectively provided on two sides of the central area, each of the latching surfaces has an inner side connected to the central area and an outer side away from the central area, a concave state of each of the latching surfaces is gradually concaved inwardly from the inner side to the outer side; an included angle with a small degree is formed between each of the latching surfaces and the central area of each of the sides; when each of the rollers is located on one edge of each of the sides, a peripheral surface of each of the rollers contacts with the corresponding latching surface and the peripheral wall of the chamber, so that the body, the rollers and the driving member are latched with one another.

7. The roller wrench as claimed in claim 6, wherein the central area of each of the sides is a flat surface.

8. The roller wrench as claimed in claim 6, wherein the included angle is between 1 degree and 10.4 degrees.

* * * * *